E. SIEGEL & J. RUPPERT, Jr.
TIRE.
APPLICATION FILED NOV. 20, 1911.
1,036,016.
Patented Aug. 20, 1912.
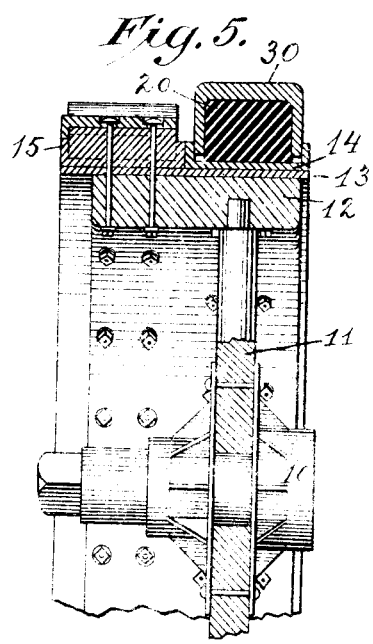
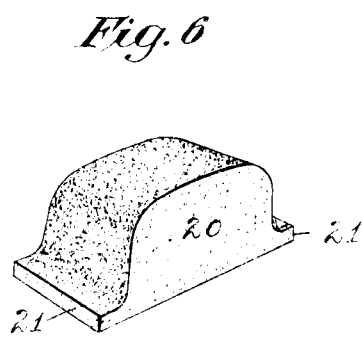
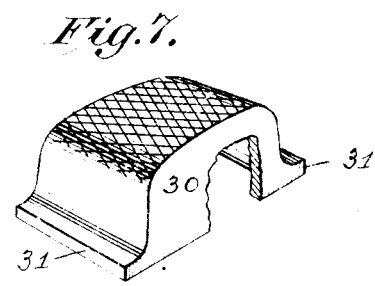
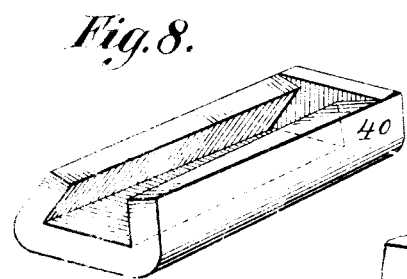
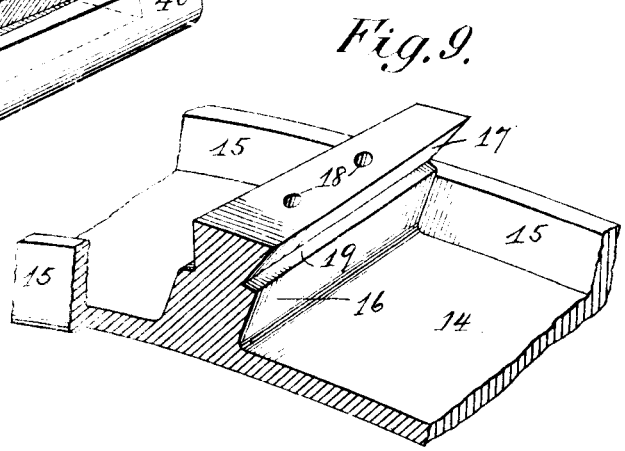

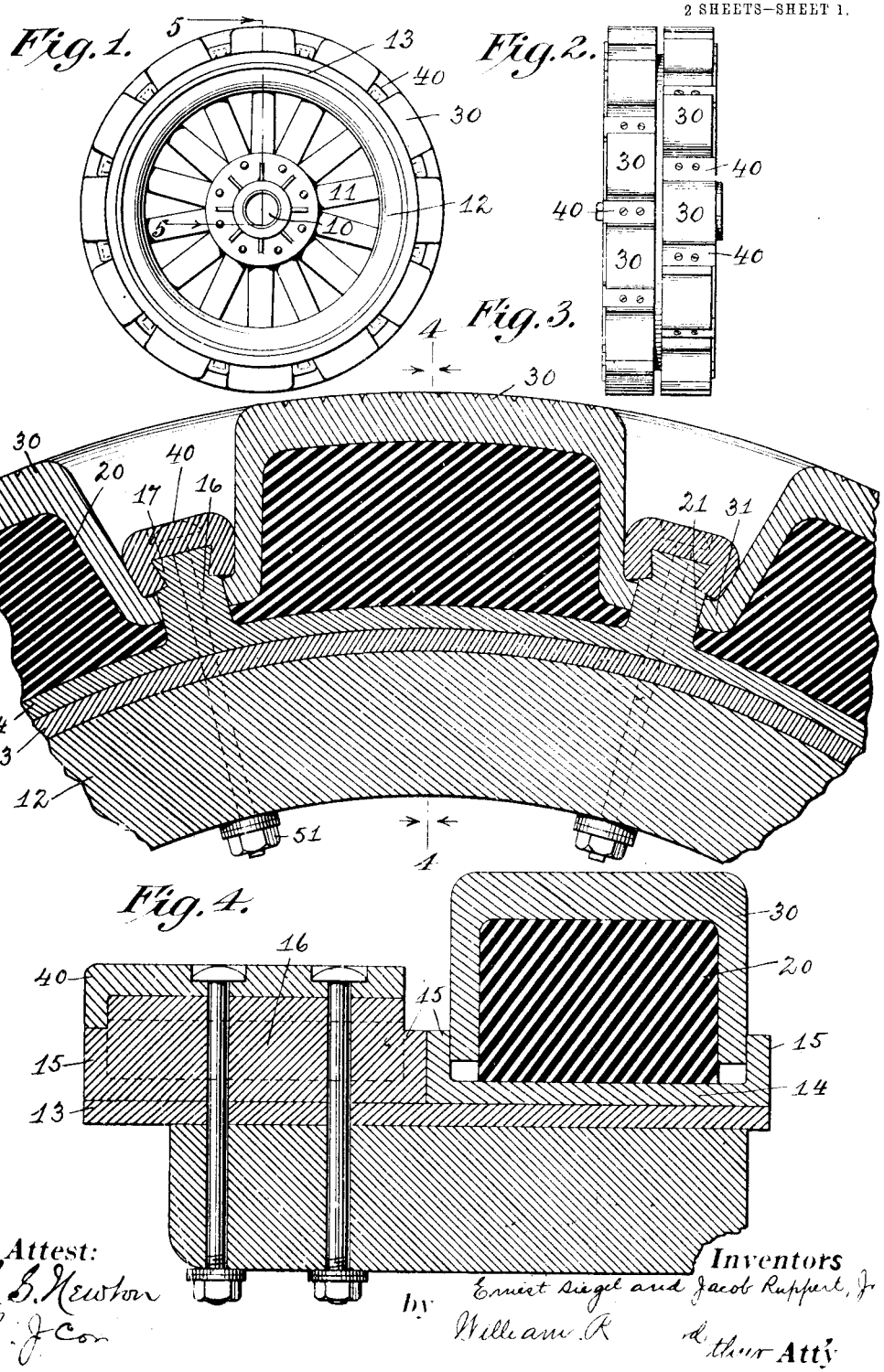

UNITED STATES PATENT OFFICE.

ERNEST SIEGEL AND JACOB RUPPERT, JR., OF NEW YORK, N. Y.

TIRE.

1,036,016.

Specification of Letters Patent.   Patented Aug. 20, 1912.

Application filed November 20, 1911.   Serial No. 661,234.

*To all whom it may concern:*

Be it known that we, ERNEST SIEGEL and JACOB RUPPERT, Jr., citizens of the United States, residing at New York, in the county of New York and State of New York, have invented certain new and useful Improvements in Tires, of which the following is a specification.

This invention relates to tires for automobile trucks and the like and its novelty consists in the construction and adaptation of the parts, as will be more fully hereinafter pointed out.

The object of the invention is to produce a strong tire, with a slow wearing tread, sufficient elasticity for its purpose, easy to make and capable of readily being put into place and removed, and with few parts which are little likely to get out of order and which may be quickly adjusted, repaired or renewed.

In the drawings, there is illustrated a tire embodying the invention.

Figure 1 is a side view in miniature of a wheel provided with the tire; Fig. 2 is an edge view thereof; Fig. 3 is an enlarged section of a portion of the tire taken on a plane at right angles to the axle; Fig. 4 is a transverse section on the plane of the line 4—4 in Fig. 3; Fig. 5 is an enlarged section on the plane of the line 5—5 in Fig. 1; Fig. 6 is a perspective of one of the cushions; Fig. 7 is a perspective of one of the treads; Fig. 8 is a perspective of one of the locking pieces, and Fig. 9 is a perspective of a portion of the rim, or tread and cushion support.

In the drawings, 10 is the hub of a wheel, 11, 11 are the spokes and 12 is the felly. Outside of and encircling the felly is a felly band 13 preferably of steel and outside of that are two rims 14, 14, side by side each having an annular flange 15 on each side, with a series of transverse ribs 16, each provided with a dovetailed upper section 17 slightly tapering toward its inner end and projecting radially of the wheel beyond the flanges 15. The ribs 16, felly, felly band, and rim are provided with one or more apertures 18 adapted to receive bolts. Cushions 20 with flanges 21 along their sides transverse to the rim and made of rubber or other suitable elastic material are adapted to be placed within the several recesses of the rim 14, formed by the annular flanges 15, 15 and the ribs 16, 16. Treads 30 are made of steel or other suitable material conforming to the shape of the cushions 20 over which they are intended snugly to fit. They are also each provided with flanges 31, 31 adapted to rest upon the flanges 21, 21 of the cushions 20 when in position. Locking members 40 comprising trough shape bodies with inwardly turned sides adapted to fit snugly over the dovetailed section 17 of each rib and open at one end and along one side and closed at the bottom, are adapted to hold the cushions and treads in position. The outer surface of these locking members is preferably curved. Each rim 14 is so arranged that the ribs of one are staggered with respect to the ribs of the other, so that when the parts are assembled, the treads on each one of these tires will be staggered with respect to those on the other. Bolts 50 are adapted to pass through the felly 12, the steel felly band 13, the rim 14, the ribs 16 and the locking members 40 to hold the parts securely together.

When the parts are to be assembled a cushion 20 is put into one of the recesses of one of the rims 14, and a similar cushion is placed in the adjoining recess. Over each of these cushions is placed one of the treads 30. The thickness of the flanges 21 and 31 is such that the treads must be pressed inward slightly and the flanges 31 of the cushion compressed in order that said flange 31 shall clear a shoulder 19 formed along the rib 16 below the dovetail. The lock member 40 is then slipped into position transversely from the outer side of the rim and its sides, embracing the dovetail, securely hold the tread 30 and consequently the cushion so in position. It will be noticed that in the form shown each lock member holds two treads, one on each side of the rib. The outer surfaces of these lock members are rounded so as to form a slightly rocking bearing for the tread and allow the latter a slight freedom of movement. The closed outer ends of the locking members exclude the dirt. After the parts have been assembled the bolts 50 are put in position and secured by nuts indicated at 51.

The wheel tires formed has metal treads, simple in shape, readily and cheaply made, held securely in position but with a cushioned support adapted to take up the shocks of traction. The rims are readily made either in one or several pieces; and the locking members are simple and efficient. Any worn or broken part is easily replaced and the destruction or impairment of one tread, one lock or one cushion does not affect the efficiency of any other similar member.

What we claim as new is:

1. An automobile wheel, or the like, comprising a rim having a series of slightly tapering transverse ribs, cushions with lateral flanges between the ribs, treads with similar flanges one over each cushion, means for locking the cushions and treads in position, consisting of a key adapted to engage each transverse rib and to be wedged thereon and the sides of which key contact with and engage the treads.

2. An automobile wheel, or the like, comprising a rim having a series of slightly tapering transverse ribs, cushions with lateral flanges between the ribs, treads with similar flanges one over each cushion, means for locking the cushions and treads in position, consisting of a key adapted to engage each transverse rib and to be wedged thereon and the sides of which key contact with and engage the treads, the key having convex sides whereby a rocking contact is established with the treads.

3. An automobile wheel, or the like, comprising a rim having a series of transverse ribs, each provided with an outer dovetail section, cushions with lateral flanges between the ribs, treads with similar flanges one over each cushion, means to lock the cushions and treads in position, consisting of a key engaging the dovetail of each transverse rib and the adjacent tread flanges, and means for locking the keys against movement on the dovetails.

In testimony whereof we affix our signatures in presence of two witnesses.

ERNEST SIEGEL,
JACOB RUPPERT, Jr.

Witnesses:
E. W. SCHERR, Jr.,
S. S. NEWTON.